US010035558B2

(12) United States Patent
Zenner et al.

(10) Patent No.: US 10,035,558 B2
(45) Date of Patent: Jul. 31, 2018

(54) HYBRID BICYCLE AND METHOD FOR CONTROLLING A DRIVE MOTOR OF A HYBRID BICYCLE

(71) Applicant: FORD GLOBAL TECHNOLOGIES, LLC, Dearborn, MI (US)

(72) Inventors: Thomas Zenner, Dueren (DE); Thomas Birkenbeil, Hennef (DE)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 15/206,699

(22) Filed: Jul. 11, 2016

(65) Prior Publication Data

US 2017/0008601 A1    Jan. 12, 2017

(30) Foreign Application Priority Data

Jul. 9, 2015    (DE) .................. 10 2015 212 835

(51) Int. Cl.
*B62M 6/90* (2010.01)
*B62M 6/45* (2010.01)
(Continued)

(52) U.S. Cl.
CPC ............... *B62M 6/45* (2013.01); *B62M 6/40* (2013.01); *B62M 6/50* (2013.01); *B62M 6/90* (2013.01); *B62K 2204/00* (2013.01)

(58) Field of Classification Search
CPC . B62M 6/45; B62M 6/55; B62M 6/40; B62M 6/90; B60K 6/485
See application file for complete search history.

(56) References Cited

U.S. PATENT DOCUMENTS 6,855,016 B1 *   2/2005   Jansen ................. B63H 16/14
                                                    440/27
7,706,935 B2 *   4/2010   Dube ..................... B62M 6/45
                                                    180/169
(Continued)

FOREIGN PATENT DOCUMENTS

CN      101607585 A      12/2009
CN      103129686 A       6/2013
(Continued)

OTHER PUBLICATIONS

Peter Eland. Falco Launch "Triple Drive" for Handcycles. Pedelecs. Mar. 20, 2014, 6 pages.
(Continued)

*Primary Examiner* — Joseph M Rocca
*Assistant Examiner* — Daniel S Yeagley
(74) *Attorney, Agent, or Firm* — Frank MacKenzie; Brooks Kushman P.C.

(57) ABSTRACT

The invention relates to a hybrid bicycle that is driven by muscle power and electrical energy, in particular a series hybrid bicycle comprising a generator whose torque can be set by a control device and dependent upon the construction is limited to a maximum generator torque, and also pedals that are connected to the generator so as to apply a pedal torque to the generator by a rider so as to drive the generator, and also a drive motor that is connected to a drive wheel of the bicycle so as to drive the drive wheel, and also a battery for supplying the drive motor.

11 Claims, 3 Drawing Sheets

(51) Int. Cl.
*B62M 6/50* (2010.01)
*B62M 6/40* (2010.01)

(56) References Cited

U.S. PATENT DOCUMENTS

| | | | | |
|---|---|---|---|---|
| 8,777,804 | B2* | 7/2014 | Takachi | B60W 20/10 |
| | | | | 180/206.3 |
| 8,831,810 | B2* | 9/2014 | Shoge | B62M 6/45 |
| | | | | 701/22 |
| 2005/0208845 | A1* | 9/2005 | Jansen | B63H 16/14 |
| | | | | 440/27 |
| 2013/0317679 | A1* | 11/2013 | Tanaka | B62M 6/45 |
| | | | | 701/22 |
| 2015/0019062 | A1* | 1/2015 | Previdi | B60L 7/12 |
| | | | | 701/22 |
| 2016/0221445 | A1* | 8/2016 | Tanaka | B62M 6/45 |
| 2016/0362021 | A1* | 12/2016 | Sveje | B60L 11/005 |

FOREIGN PATENT DOCUMENTS

| | | |
|---|---|---|
| DE | 19600698 A1 | 8/1997 |
| DE | 19732430 A1 | 2/1999 |
| JP | 2014195366 A | 10/2014 |
| KR | 20100001761 U | 2/2010 |

OTHER PUBLICATIONS

Sebastian Blanco. "BMW Cruise e-Bike 2014". Oath Inc. Oct. 16, 2013, 6 pages.

* cited by examiner

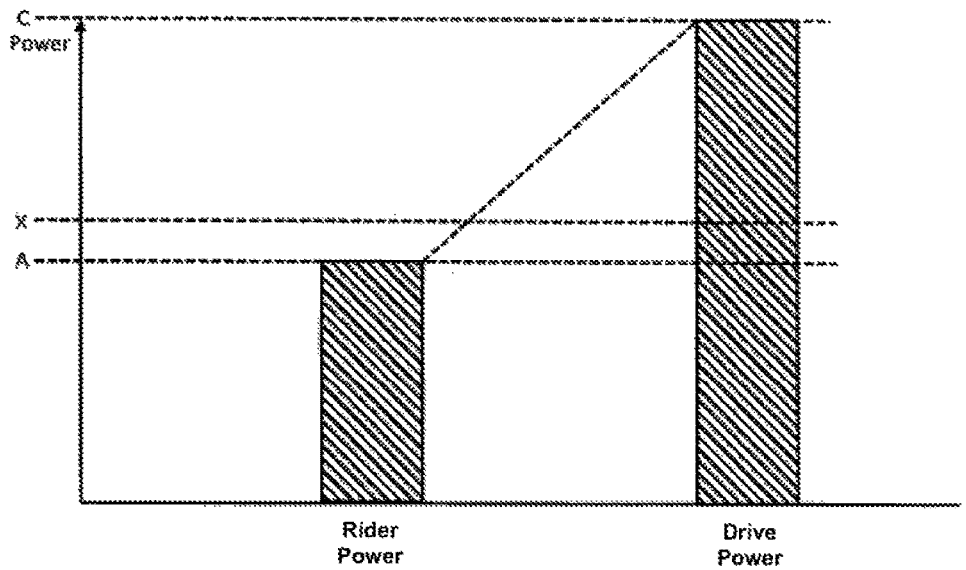
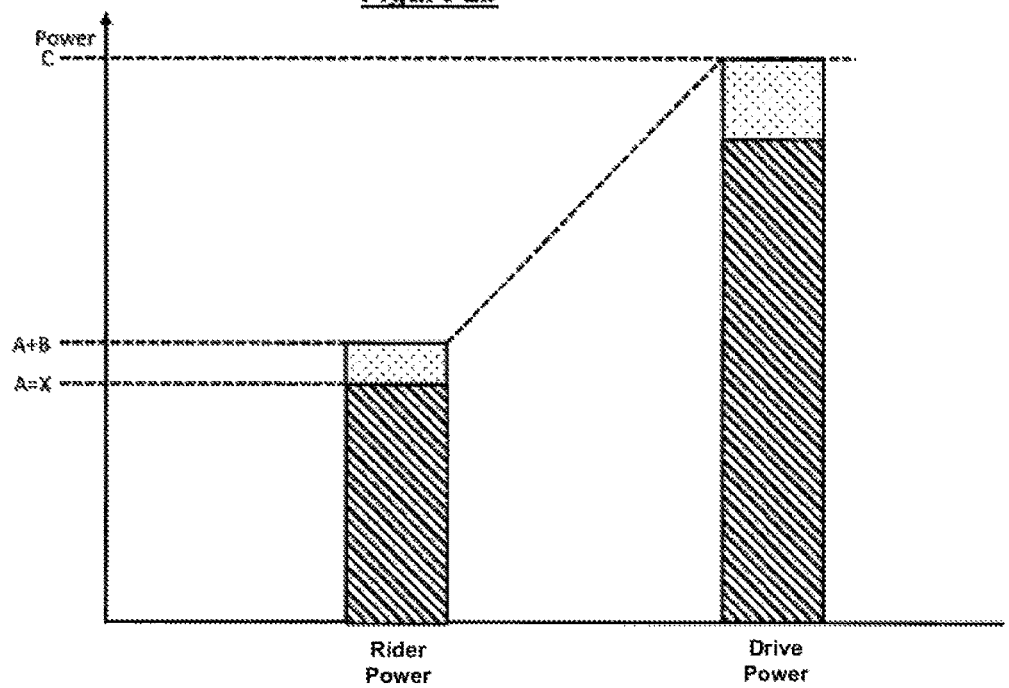

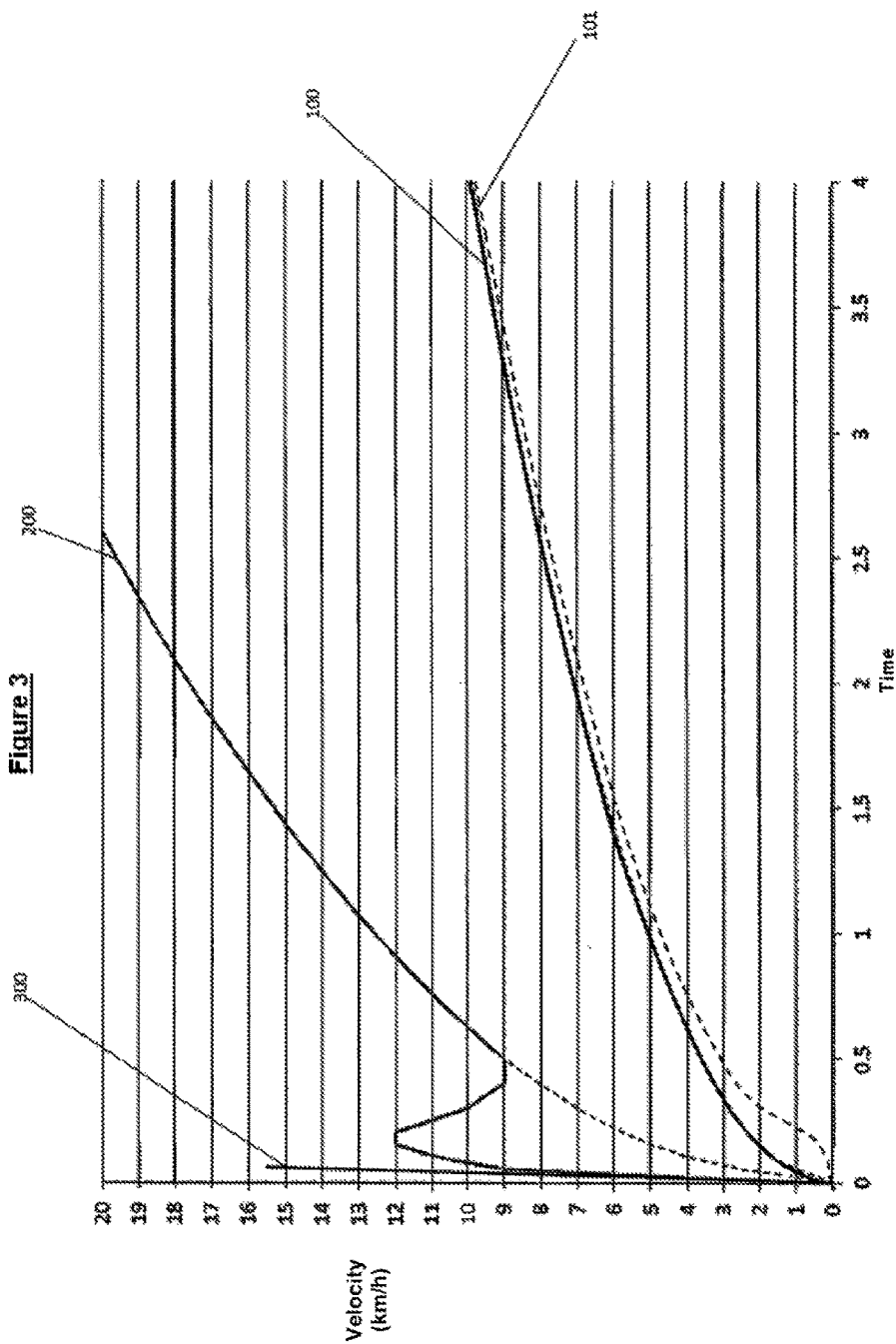

HYBRID BICYCLE AND METHOD FOR CONTROLLING A DRIVE MOTOR OF A HYBRID BICYCLE

CROSS-REFERENCE TO RELATED APPLICATIONS

This application claims foreign priority benefits under 35 U.S.C. § 119(a)-(d) to DE 10 2015 212 835.0, filed Jul. 9, 2015, which is hereby incorporated by reference in its entirety.

TECHNICAL FIELD

The invention relates to a hybrid bicycle that is driven by means of muscle power and electrical energy and also a method for controlling a drive motor of a hybrid bicycle.

BACKGROUND

Conventional bicycles comprise pedals that are mounted on an axle of a bottom bracket and consequently are guided by way of the bottom bracket. The drive of the conventional bicycle is provided by virtue of the fact that the pedals are rotated about the bottom bracket axle and this rotational movement is transferred directly to a drive wheel, by way of example by way of pinion and chain. The power that a rider applies by means of muscle power onto the pedals is consequently passed directly on to the drive wheel so that the drive of the bicycle that the rider can perceive corresponds to the effort that is expended by said rider, namely the muscle power that said rider provides. In accordance with hybrid bicycles of the generic type that are driven by means of muscle power and electrical energy, in contrast the drive wheel is not driven directly by means of the pedals but rather at least in part by means of an electric drive motor. In the case of series hybrid bicycles, the drive of the drive wheel is provided solely by means of an electric drive motor that is supplied with electrical energy. The pedals in contrast solely operate a generator so that electrical energy is generated by means of muscle power, said electrical energy being supplied selectively to the battery and/or the drive motor.

In the case of hybrid bicycles in accordance with the generic type, it is necessary to always intelligently control the drive motor so that the drive power that the drive motor supplies to the drive wheel corresponds to the drive power that the rider desires and that the rider typically—as said rider is used to in conventional bicycles—would like to simulate by way of consciously using his muscle power on the pedals.

The exact correlation between the torque of the drive wheel and the pedal torque that is applied by the rider while maintaining a constant translational ratio is however only inadequately achieved in the case of series hybrid bicycles of the generic type. By way of example, hybrid bicycles are thus known in which the drive motor is always connected to a drive power that is constantly predetermined by the rider if the control device of the hybrid bicycle detects an actuation of the pedals. As a consequence, however, it is not possible to predetermine the drive power at the drive wheel by means of the drive motor in dependence upon the situational desire of the rider, said drive power being predetermined by way of the muscle power of said rider on the pedals. Moreover, hybrid bicycles are known in which the pedal torque that a rider applies to the pedals and that correlates directly with the muscle power that is applied over the length of the crank arm of the bottom bracket is determined with the aid of a generator that is driven by means of the pedals. The drive torque of the drive motor is then set directly proportional to the pedal torque that is determined by way of the generator while maintaining a constant rotational speed translation. Although such hybrid bicycles of the generic type can render possible in certain operating situations a sufficient correlation between drive power that prevails at the drive wheel and the rider power that is applied by way of muscle power by means of the rider, this correlation is in fact broken at least in extreme situations by way of example in the case of the pedals being influenced with a torque that exceeds the maximum torque of the generator such as by way of example when setting off or sprinting. Since in the case of the described hybrid bicycles of the generic type the drive power can only be proportional to the rider power that is applied for as long as the generator is influenced with a pedal torque that is lower than its maximum generator torque, in such extreme situations the rider finds that when applying a particularly intense muscle power, it is not possible to generate an accordingly particularly intense propulsion of the hybrid bicycle.

SUMMARY

The object of the present invention is to provide a hybrid bicycle that at least in part rectifies the described problems of hybrid bicycles of the generic type. Moreover, the object of the present invention is to provide a method for controlling the drive motor of a hybrid bicycle that at least in part rectifies the above described problems.

The invention proposes a hybrid bicycle having features as a solution to at least one of the mentioned technical objects. The hybrid bicycle in accordance with the invention is driven by means of muscle power and electrical energy and can in particular be embodied as a series hybrid bicycle. The hybrid bicycle comprises a generator whose torque can be set by means of a control device and dependent upon construction is limited to a maximum generator torque. It is necessary to take into account that each electric generator is limited by means of its constructive embodiment in its generator torque to its maximum generator torque. If a generator is influenced with a torque that exceeds its maximum generator torque, then from the power that is prevailing at said generator that results from "torque*angular velocity" said generator thus only converts the part that results from "maximum generator torque * angular velocity" into electrical energy while the excess power only accelerates the rotating mass of the generator. Moreover, the hybrid bicycle in accordance with the invention comprises pedals that are connected to the generator so as to apply a pedal torque to the generator by means of a rider so as to drive the generator. The hybrid bicycle in accordance with the invention furthermore comprises a drive motor that is connected to a drive wheel of the bicycle so as to drive the drive wheel, and also a battery for supplying the drive motor. The battery is an energy storage device for electrical energy. For this purpose, by way of example it is possible to use conventional nickel metal hydride or lithium ion rechargeable batteries. The generator, the drive motor and the battery of the hybrid bicycle are electrically connected to one another, wherein the generator can supply the battery with electrical energy by way of the electrical connection to the battery and the battery can supply the drive motor with electrical energy by way of the electrical connection to the drive motor. Moreover, it can be possible to recirculate braking energy from the drive motor/-generatorinto the batteries. Moreover, in one embodiment, the generator is electrically connected to the drive motor so as to directly supply the drive motor with electrical energy. By way of example, the generator, drive motor and battery can be connected to one another by way of the control device. By way of example, the control device of a hybrid bicycle in accordance with the invention is embodied for the purpose of distributing the electrical energy between the drive motor and battery, said electrical energy being generated by the generator. The hybrid bicycle in accordance with the invention moreover comprises the control device that is embodied for the purpose of determining the generator power that is generated by means of the pedals at the generator as a first rider power. The control device can comprise by way of example a microprocessor and/or a storage device. By way of example, the maximum generator torque can be stored in the control device. Naturally, the control device is electrically connected to the generator and the drive motor and in particular the battery in order to be able to control and/or select said components. In accordance with the invention, the hybrid bicycle moreover comprises a pedal rotational speed sensor by way of which it is possible to determine the rotational speed of the pedals. It is clear to the person skilled in the art that this is the rotational speed of the pedals about the bottom bracket axle. In accordance with the invention, the control device is embodied so as to determine a value for a pedal rotational speed when reaching or exceeding the maximum generator torque by means of the pedal torque and to determine a second rider power by way of a first predetermined function in dependence upon the value of the pedal rotational speed. The control device is embodied for the purpose of determining a total rider power from the sum of the first and the second rider power, and to control the drive motor so as to apply a drive power that is set by means of a second predetermined function in dependence upon the total rider power. The power that is required in addition to the generator power is supplied by the battery.

In the case of a hybrid bicycle in accordance with the invention it is thus possible even in extreme situations, such as an extreme load on the pedals by means of a muscle power such as by way of example when setting off, to perform an exact correlation between the drive power that prevails at the drive wheel and the muscle power that is applied by the rider. This is in particular of importance for series hybrid bicycles in which the drive wheel is solely in a drive connection with the drive motor and consequently is driven solely by means of the drive motor which is why it is particularly important that the drive power that is output by the drive motor to the drive wheel corresponds to the wishes of the rider, in particular in extreme situations. The inventors have recognized when designing the hybrid bicycle in accordance with the invention that in the event of an extreme load on the pedals by means of muscle power, the pedals "spin" since the generator cannot use all the pedal torque that is applied to the generator by means of the pedals to generate electrical energy, as a result of which the pedal rotational speed abruptly increases. The inventors have consequently identified that it is particularly advantageous after achieving and consequently in particular when exceeding the maximum generator torque by means of the pedal torque to additionally determine a value of the pedal rotational speed in order to thus predetermine the drive power that is output from the drive motor to the drive wheel in dependence upon two separately determined rider powers. The first rider power corresponds to the generator power that is generated by means of the pedals at the generator, said power being proportional to the product of generator torque and angular velocity. The second rider power is determined from the value of the pedal rotational speed. In one embodiment, the prevailing magnitude of pedal rotational speed is used as a value of the pedal rotational speed in order to determine the second driver power with the first predetermined function. This magnitude of the pedal rotational speed can be indicated in the unit rpm ("revolutions per minute", in other words rotations per minute) and by way of example can also be described as prevailing angular velocity and indicated in the unit $s^{-1}$. By way of example, the first predetermined function can predetermine a linear dependency of the second rider power of this magnitude of the prevailing pedal rotational speed, by way of example by means of the equation $$\text{Second rider power}=K*\text{Pedal rotational speed}-C,$$

wherein in an exemplary embodiment K can be predetermined by the rider. C refers to a predetermined value. By way of example, C can also be predetermined as a constant, by way of example as identical to the first rider power. In a further exemplary embodiment, the time gradient of the pedal rotational speed and consequently the time change in the pedal rotational speed or expressed mathematically the time derivative of the pedal rotational speed is used as a value of the pedal rotational speed so as to determine the second rider power by means of the first predetermined function. As a consequence, the effect of the "spinning" in the case of higher loads on the pedals can be taken into account in a particularly effective manner. By way of example, the first predetermined function predetermines a linear dependency between the time gradients of the pedal rotational speed and the second rider power, by way of example by way of the equation $$\text{Second rider power}=q*\text{time gradient of the pedal rotational speed},$$

wherein q by way of example can be predetermined as proportional to the maximum generator torque and/or indirectly proportional to the prevailing pedal rotational speed at which the time gradient was determined. The second predetermined function can be set in a conventional manner as in the case of hybrid bicycles of the generic type, by way of example as a function that sets the drive power proportionally to the total rider power, by way of example by way of the equation:

$$\text{Drive power}=a*\text{total rider power}$$

wherein a by way of example can be predetermined by the rider or can be set predetermined in proportion to such a predetermined value of the rider. Naturally, examples other than those mentioned for setting the first and second predetermined function are feasible, by way of example also parabolic or logarithmic dependencies.

In one embodiment, the control device is embodied for the purpose of determining the charging state of the battery, wherein the control device is embodied for the purpose of using the first rider power as a total rider power without taking into account the second rider power so as to predetermine the drive power with reference to the second predetermined function when the charging state is below a predetermined minimum charging state. In particular, for the event that the charging state is below the predetermined minimum charging state, a modified second function can be predetermined in which only a small increase occurs in the first rider power or the first rider power does not increase at all. This can create the advantage that the energy consumption of electrical energy of the battery is reduced and in particular a further discharge of the battery is prevented if the battery achieves a critical charging state. In the case of this embodiment, the hybrid bicycle in accordance with the invention is embodied in such a manner that in the case of a critical charging state of the battery, in other words in the case of the charging state being below a predetermined minimum charging state that can be stored by way of example in the control device, saving energy of the battery is prioritized with respect to ensuring an always exact correlation between muscle power and drive power so that this exact correlation can only be ensured in the case of the battery being sufficiently charged.

In one exemplary embodiment, the hybrid bicycle comprises a drive wheel rotational speed sensor for determining the drive wheel rotational speed of the drive wheel. In particular, the control device can be embodied so as to determine the drive wheel rotational speed and to perform a complex procedure of controlling the drive motor in dependence upon the drive wheel rotational speed, which can lead to particularly advantageous characteristics of the hybrid bicycle. It is possible to control a drive motor in a particularly precise manner if the drive wheel rotational speed is known. In one exemplary embodiment, the control device is embodied for the purpose of setting the second predetermined function in dependence upon the determined drive wheel rotational speed, in particular in an explicit manner. By way of example, the second predetermined function can predetermine a linear dependency between the total rider power and the drive power as explained above, wherein the proportionality factor a can be selected in dependence upon the determined drive wheel rotational speed. By way of example, this dependency of a can be set to the extent that a increases in the case of a decreasing drive wheel rotational speed so that in the case of the hybrid bicycle slowing down, the muscle power of the rider is more intensely enhanced by means of the drive motor, however in the case of a rapid movement forward of the hybrid bicycle only a comparatively low drive power is applied so as to save energy.

In one exemplary embodiment, the control device is embodied so as to set the torque and/or rotational speed of the generator in dependence upon the drive wheel rotational speed by way of a third predetermined function, wherein in particular the third predetermined function can be set by means of a translational parameter that can be selected by means of the rider. The muscle power that it is necessary for a rider to apply so as to move the pedals can vary with the drive wheel rotational speed and consequently the velocity of the hybrid bicycle by means of setting the torque and/or the rotational speed of the generator in dependence upon the drive wheel rotational speed, which corresponds to the riding behavior of conventional bicycles. Furthermore, a rider can perform an "electronic switch" as a result of which the riding characteristics of the hybrid bicycle in accordance with the invention can be tailored particularly well to the riding behavior of conventional bicycles by way of selecting the translation parameters.

Moreover, the invention comprises a method for controlling a drive motor of a hybrid bicycle, in particular a hybrid bicycle in accordance with the invention whose pedals are connected to a generator so as to apply a pedal torque to the generator by means of a rider so as to drive the generator. The generator power that is generated by means of the pedals at the generator is determined as a first rider power. Moreover, the pedal torque is determined. A value of the pedal rotational speed is determined in the case of achieving or exceeding a maximum generator torque by means of the pedal torque. A second rider power is determined by way of a first predetermined function in dependence upon the value of the pedal rotational speed. A total rider power is determined from the sum of the first and the second rider power, and the drive motor is controlled so as to apply a drive power that is set by means of a second predetermined function in dependence upon the total rider power. The method in accordance with the invention creates advantages in accordance with the invention that are further explained above in conjunction with a hybrid bicycle in accordance with the invention. Moreover, the method in accordance with the invention can comprise further advantageous features that have been described above in conjunction with the hybrid bicycle in accordance with the invention.

The invention is further explained hereinunder with reference to the three figures. In the figures:

BRIEF DESCRIPTION OF THE DRAWINGS

FIGS. 2a and 2b illustrate schematic diagrams for illustrating the first rider power, second rider power, total rider power and drive power.

FIG. 3 illustrates a schematic diagram for illustrating the time curve of the pedal rotational speed and the velocity of a hybrid bicycle in accordance with the invention when setting off.

DETAILED DESCRIPTION

Figure 1:
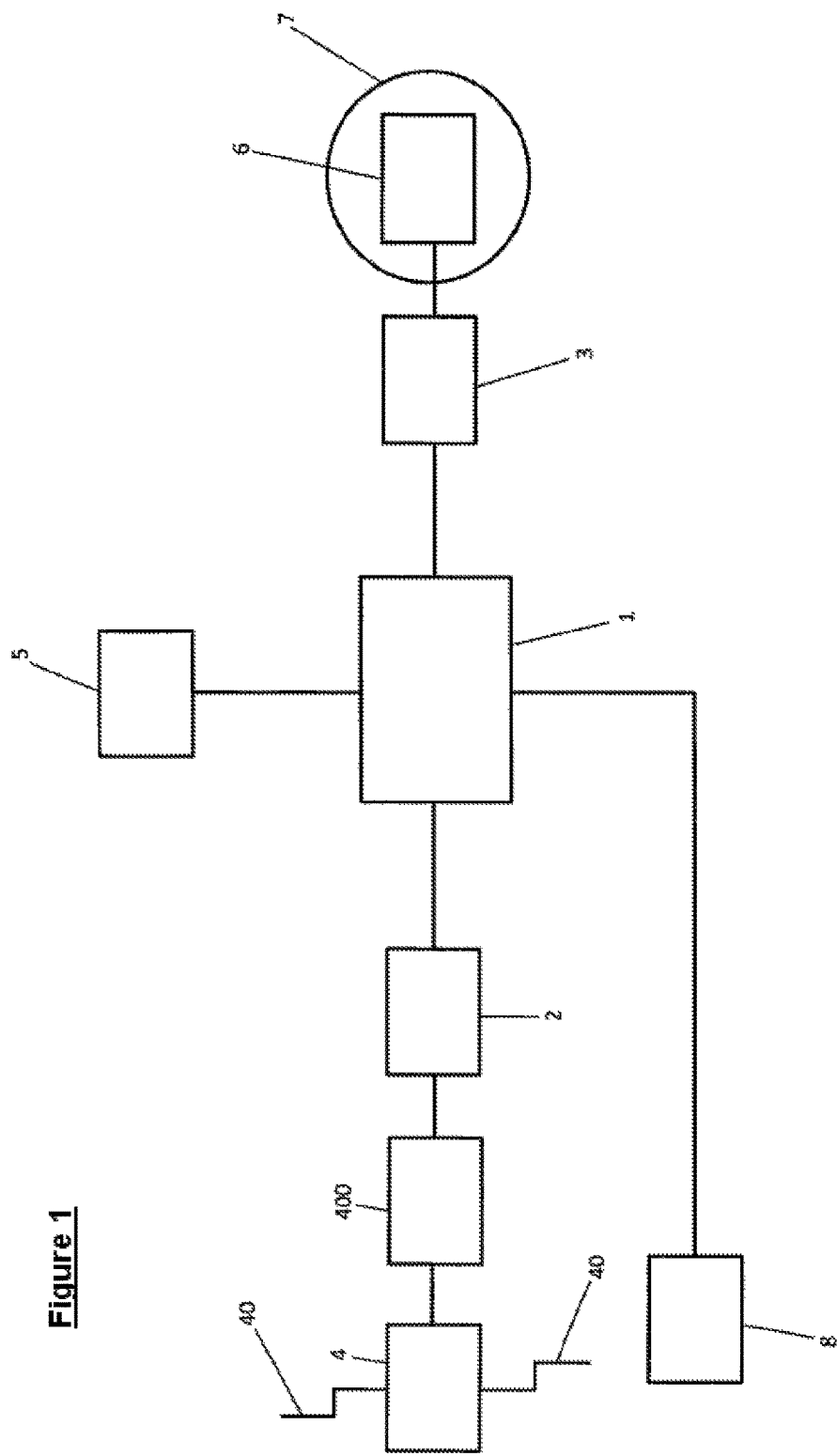
FIG. 1 illustrates a schematic diagram of a section of a hybrid bicycle in accordance with the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a section of an embodiment of a hybrid bicycle in accordance with an invention in a schematic diagram. The hybrid bicycle comprises a bottom bracket 4 having pedals 40. The pedals 40 are connected to a generator 2 so as to drive the generator 2, wherein a gear is connected between the pedals and the generator, in the described exemplary embodiment a reduction gear 400. The generator 2 is connected to a battery 5 and a drive motor/-generator 3 so as to supply the battery 5 and the drive motor/-generator 3 with electrical energy. Moreover, the hybrid bicycle that is illustrated comprises a control device 1 that is connected to the generator 2 and the drive motor 3. The battery 5 and generator 2 are electrically connected in the present case by way of the control device 1 to the drive motor 3. The control device 1 controls on the one hand the drive motor 3 and predetermines the drive power C that is output by the drive motor 3 to the drive wheel 7. On the other hand, the control device 1 controls the distribution between battery 5 and drive motor 3 of the electrical energy that is generated by the generator 2. Moreover, the control device 1 is connected to a selecting switch 8 with which a rider can influence the second predetermined function. In the present case, the second predetermined function is set in such a manner that the drive power C is set by way of a factor a directly proportional to the total rider power, wherein the rider can predetermine the proportionality factor by way of the selector switch 8. It is evident from FIG. 1 that the drive motor 3 is connected by way of a gear 6 to the drive wheel 7 and consequently outputs by way of the gear 6 its drive power C to the drive wheel 7.

In FIG. 2 comprising the FIGS. 2a and 2b, two different operating situations of a hybrid bicycle in accordance with the invention are illustrated. In the operating situation in accordance with FIG. 2a, the pedal torque that is exerted by the rider on the pedals 40 is less than the maximum generator torque X. Accordingly, the first rider power that is generated by the rider is less than the maximum generator power. Consequently, the drive power C is predetermined directly proportionally to the first rider power A by means of the control device 1, in the present case the drive power C is double the first rider power A. In the operating situation in accordance with FIG. 2b, the pedal torque that is applied by the rider and consequently the power that is applied by the rider exceeds the maximum generator torque or the maximum generator power X. The first rider power A corresponds consequently to the maximum generator power X that is determined by means of the control device 1 as the power that is generated at the generator. In addition, the control device 1 determines a second rider power B that in the present case is determined in dependence upon the time gradient of the pedal rotational speed. The control device 1 consequently determines the power A+B as the total rider power. The control device 1 determines the drive power C as explained above by way of the second predetermined function that is predetermined as explained as a proportionality function so that the drive power C output when, the control device 1 is controlling the drive motor 3 is twice the total rider power A+B.

The riding behavior of a hybrid bicycle in accordance with the invention is clearly evident in FIG. 3. FIG. 3 illustrates the velocity 100 of a hybrid bicycle in accordance with the invention in km/h in dependence upon the time. In addition, the velocity 101 of a conventional hybrid bicycle is illustrated in dependence upon the time. Moreover, the time gradient of the pedal rotational speed 300 is illustrated in an operating situation in accordance with FIG. 2b and also the pedal rotational speed 200 (in rpm revolutions per minute). It is evident in FIG. 3 that when setting off, the pedal rotational speed 200 deviates considerably from the behavior illustrated with the continuous dashed line in the setting off time period and proceeds in a very erratic manner. Accordingly, the time gradient 300 of the pedal rotational speed 200 is extremely high just when setting off. In the case of a conventional hybrid bicycle, the velocity 101 however slowly becomes greater since the "rotation" of the pedals 40 is not captured and consequently the drive power C with which the hybrid bicycle is driven is too low at the beginning. In contrast, the case of a hybrid bicycle in accordance with the invention, the velocity 100 increases rapidly due to taking into account the time gradients of the pedal rotational speed 300 so that a hybrid bicycle in accordance with the invention comprises a pleasant riding behavior.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A series hybrid bicycle comprising a generator whose torque can be set via a control device and is limited to a maximum generator torque, pedals that are connected to the generator so as to apply a pedal torque to the generator via a rider so as to drive the generator, a drive motor that is connected to a drive wheel of the hybrid bicycle so as to drive the drive wheel, a battery for supplying the drive motor, wherein the generator, the drive motor and the battery are electrically connected to one another, and a control device configured to determine a power of the generator that is generated via the pedals as a first rider power, the series hybrid bicycle comprises a pedal rotational speed sensor, the control device is configured to determine a value for a pedal rotational speed when achieving or exceeding the maximum generator torque via the pedal torque and to determine a second rider power via a first predetermined function in dependence upon the value of the pedal rotational speed, the control device is configured to determine from a sum of the first rider power and the second rider power a total rider power and to control the drive motor so as to apply a drive power that is set via a second predetermined function in dependence upon the total rider power, the hybrid bicycle comprises a drive wheel rotational speed sensor for determining a drive wheel rotational speed of the drive wheel, the control device is configured to set a torque of the generator or a rotational speed of the generator in dependence upon the drive wheel rotational speed via a third predetermined function, and the third predetermined function is set via a translational parameter selected by the rider.

2. The hybrid bicycle as claimed in claim 1, wherein the drive wheel is in a drive connection solely with the drive motor, and wherein the drive wheel is driven solely via the drive motor.

3. The hybrid bicycle as claimed in claim 1, wherein the control device is configured to determine a charging state of the battery, and wherein the control device is configured to use the first rider power as the total rider power without taking into account the second rider power so as to predetermine the drive power with reference to the second predetermined function in response to the charging state being below a predetermined minimum charging state.

4. The hybrid bicycle as claimed in claim 1, wherein the value of the pedal rotational speed indicates time gradients of the pedal rotational speed.

5. The hybrid bicycle as claimed in claim 1, wherein the control device is configured to set the second predetermined function in dependence upon the determined drive wheel rotational speed.

6. A bicycle comprising:
a generator;
pedals drivably connected to the generator;
a motor configured to receive electrical power from the generator and drivably connected to a wheel; and
a controller configured to,
responsive to a speed of the pedals exceeding a value corresponding to a maximum torque for the generator, command the motor to generate a total drive power based on a power corresponding to the maximum torque and a power corresponding to the speed of the pedals, and responsive to the speed of the pedals exceeding the value corresponding to the maximum torque for the generator and a state of charge of a battery being less than a threshold value, command the motor to generate the total drive power based on a power corresponding to the maximum torque only.

7. The bicycle of claim 6, wherein the speed of the pedals is a time gradient of the speed of the pedals.

8. The bicycle of claim 6, wherein the total drive power is a sum of the power corresponding to the maximum torque and the power corresponding to the speed of the pedals.

9. A method for bicycle operation comprising:
   by a controller,
      responsive to a time gradient of speed of pedals drivably connected to a generator exceeding a value corresponding to a maximum torque for the generator, commanding a motor to generate a total drive power for the motor drivably connected to a wheel based on a power corresponding to the maximum torque and a power corresponding to the time gradient of the speed of the pedals.

10. The method of claim 9 further comprising, responsive to the time gradient of the speed of the pedals exceeding the value corresponding to the maximum torque for the generator and a state of charge of a battery being less than a threshold value, commanding the motor to generate the total drive power based on the power corresponding to the maximum torque only.

11. The method of claim 9, wherein the total drive power is a sum of the power corresponding to the maximum torque and the power corresponding to the time gradient of the speed of the pedals.

\* \* \* \* \*